United States Patent [19]

McMurtrie

[11] Patent Number: 5,571,228
[45] Date of Patent: Nov. 5, 1996

[54] BODY SUPPORTED FISHING ROD HOLDER

[76] Inventor: Kevin J. McMurtrie, 1700 Butler Pike, 28-C, Conshohocken, Pa. 19428

[21] Appl. No.: 438,086

[22] Filed: May 8, 1995

[51] Int. Cl.$^6$ .............................. A01K 97/10; A45F 4/00
[52] U.S. Cl. ................................. 43/21.2; 224/922
[58] Field of Search ................... 43/21.2; 248/104; 224/922, 200, 151

[56] References Cited

U.S. PATENT DOCUMENTS

| | | | |
|---|---|---|---|
| 2,846,129 | 8/1958 | O'Brien | 229/922 |
| 2,973,125 | 2/1961 | Parry | 224/922 |
| 2,995,855 | 8/1961 | Bell | 43/21.2 |
| 3,021,101 | 2/1962 | Gliebe | 43/21.2 |
| 3,282,482 | 11/1966 | Scharsu | 224/922 |
| 3,874,573 | 4/1975 | Fruscella | 43/21.2 |
| 4,569,466 | 2/1986 | Webber | 224/922 |
| 4,739,914 | 4/1988 | Pothetes | 224/922 |
| 4,896,806 | 1/1990 | Sanchez | 224/200 |
| 5,044,109 | 9/1991 | Fast | 43/21.2 |
| 5,123,578 | 6/1992 | Morse | 43/21.2 |

Primary Examiner—Kurt Rowan

[57] ABSTRACT

A holder for supporting a fishing rod relative to an individual. The inventive device includes an engaging assembly for securing to a fishing rod. A mounting assembly extends from the engaging assembly for securing the device relative to an individual.

1 Claim, 3 Drawing Sheets

5,571,228

BODY SUPPORTED FISHING ROD HOLDER

BACKGROUND OF THE INVENTION

1. Field of the Invention

The present invention relates to holding devices and more particularly pertains to a body supported fishing rod holder for supporting a fishing rod relative to an individual.

2. Description of the Prior Art

The use of holding devices is known in the prior art. More specifically, holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art holding devices include U.S. Pat. Nos. 4,546,566; 4,739,914; 4,896,806; 5,024,018; 5,105,574; 271,413; and 318,954.

While these devices fulfill their respective, particular objectives and requirements, the aforementioned patents do not disclose a body supported fishing rod holder for supporting a fishing rod relative to an individual which includes an engaging means for securing to a fishing rod, and a mounting means extending from the engaging means for securing the device relative to an individual.

In these respects, the body supported fishing rod holder according to the present invention substantially departs from the conventional concepts and designs of the prior art, and in so doing provides an apparatus primarily developed for the purpose of supporting a fishing rod relative to an individual.

SUMMARY OF THE INVENTION

In view of the foregoing disadvantages inherent in the known types of holding devices now present in the prior art, the present invention provides a new body supported fishing rod holder construction wherein the same can be utilized for supporting a fishing rod relative to an individual. As such, the general purpose of the present invention, which will be described subsequently in greater detail, is to provide a new body supported fishing rod holder apparatus and method which has many of the advantages of the holding devices mentioned heretofore and many novel features that result in a body supported fishing rod holder which is not anticipated, rendered obvious, suggested, or even implied by any of the prior art holding devices, either alone or in any combination thereof.

To attain this, the present invention generally comprises a holder for supporting a fishing rod relative to an individual. The inventive device includes an engaging assembly for securing to a fishing rod. A mounting assembly extends from the engaging assembly for securing the device relative to an individual.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new body supported fishing rod holder apparatus and method which has many of the advantages of the holding devices mentioned heretofore and many novel features that result in a body supported fishing rod holder which is not anticipated, rendered obvious, suggested, or even implied by any of the prior art holding devices, either alone or in any combination thereof.

It is another object of the present invention to provide a new body supported fishing rod holder which may be easily and efficiently manufactured and marketed.

It is a further object of the present invention to provide a new body supported fishing rod holder which is of a durable and reliable construction.

An even further object of the present invention is to provide a new body supported fishing rod holder which is susceptible of a low cost of manufacture with regard to both materials and labor, and which accordingly is then susceptible of low prices of sale to the consuming public, thereby making such body supported fishing rod holders economically available to the buying public.

Still yet another object of the present invention is to provide a new body supported fishing rod holder which provides in the apparatuses and methods of the prior art some of the advantages thereof, while simultaneously overcoming some of the disadvantages normally associated therewith.

Still another object of the present invention is to provide a new body supported fishing rod holder for supporting a fishing rod relative to an individual.

Yet another object of the present invention is to provide a new body supported fishing rod holder which includes an engaging means for securing to a fishing rod, and a mounting means extending from the engaging means for securing the device relative to an individual.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
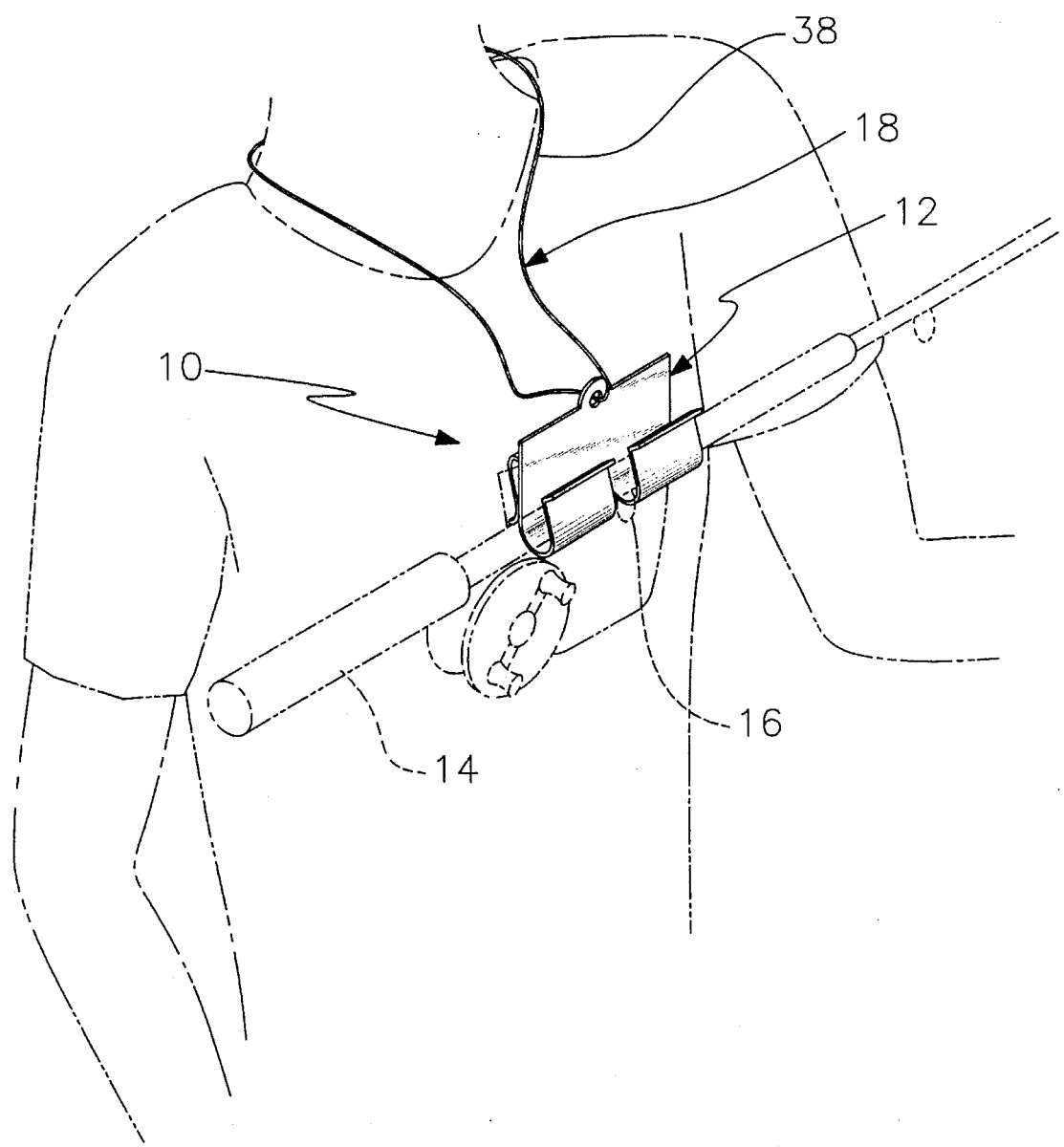
FIG. 1 is an isometric illustration of a body supported fishing rod holder according to the present invention in use.

With reference now to the drawings, and in particular to FIGS. 1–6 thereof, a new body supported fishing rod holder embodying the principles and concepts of the present invention and generally designated by the reference numeral 10 will be described.

More specifically, it will be noted that the body supported fishing rod holder 10 comprises an engaging means 12 for engaging a fishing rod 14 along opposed longitudinal sides of a projection extending from the fishing rod such as a line guide 16, as shown in FIG. 1 of the drawings. A mounting means 18 is coupled to the engaging means 12 for securing the engaging means and associated fishing rod 14 relative to an individual during use of the device 10.

Figure 2:
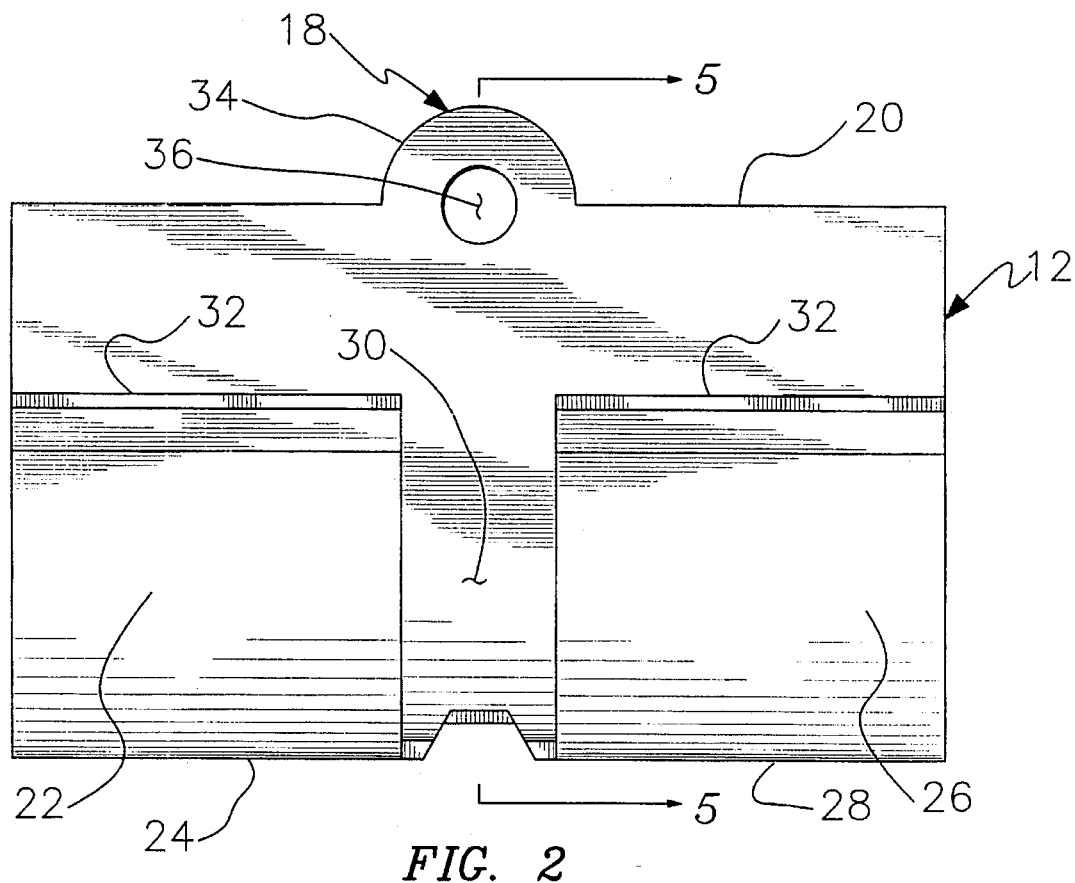
FIG. 2 is a front elevation view of the invention, per se.
Figure 3:
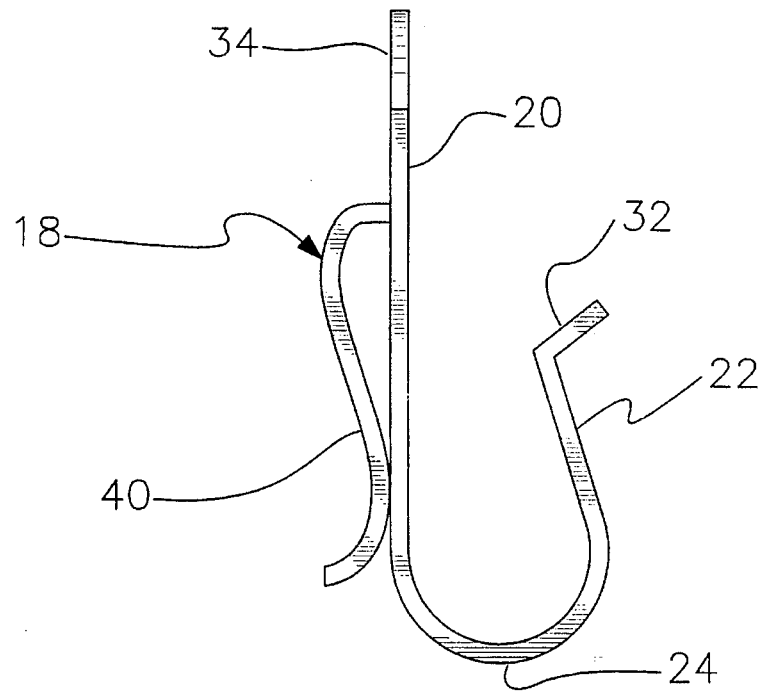
FIG. 3 is a side elevation view thereof.
Figure 4:
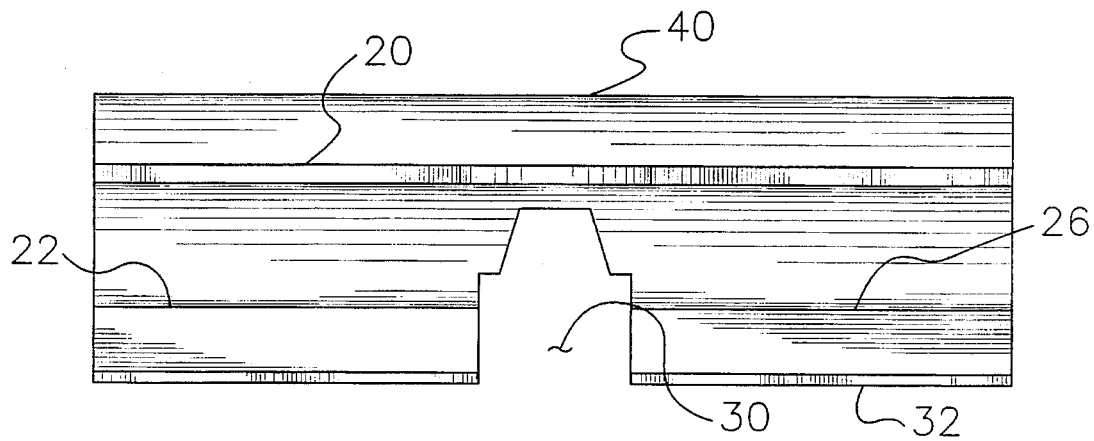
FIG. 4 is a top plane view of the present invention.
Figure 5:
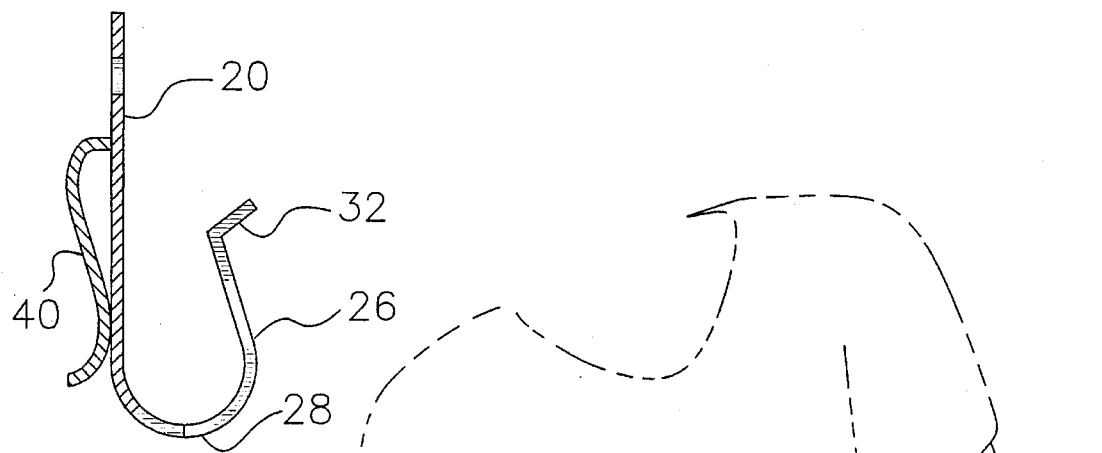
FIG. 5 is a cross sectional view taken along lien 5—5 of FIG. 2.

As best illustrated in FIGS. 2 through 4, it can be shown that the engaging means 12 according to the present invention 10 preferably comprises a substantially rectangular back plate 20 having a lower edge spaced from an upper edge, with lateral edges extending substantially orthogonally between the upper and lower edges. A first clamp plate 22 is coupled to the lower edge of the back plate 20 proximal to a first lateral edge thereof by an integral bend 24. The first clamp plate 22 extends from the integral bend 24 and projects towards the back plate 20. Similarly, a second clamp plate 26 is coupled to the lower edge of the back plate 20 proximal to a second one of the lateral edges thereof by an integral bend 28 and extends towards the back plate 20. The clamp plates 22 and 26, as well as the integral bends 24 and 28 are constructed of a substantially resilient material permitting selective deformation thereof away from the back plate 20 during insertion of a fishing rod 14 between the clamp plates and the back plate 20, whereby a resilient contraction of the clamp plates towards the back plate 20 frictionally engages and retains the fishing rod 14 therebetween. The first clamp plate 22 is separated from the second clamp plate 26 so as to define a spacing void 30 through which a projection of the fishing rod 14, such as the line guide 16 illustrated in FIG. 1 of the drawings, can extend. Although not specifically illustrated, the fishing rod 14 can be positioned such that a reel thereof extends through the spacing void 30 as determined by an end user to facilitate balancing of the fishing rod within the engaging means 12. To facilitate insertion of the fishing rod between the back plate 20 and the clamp plates 22 and 26, each of the clamp plates is further provided with guide flange 32 projecting therefrom and oriented at an oblique angle relative to the back plate 20.

Figure 6:
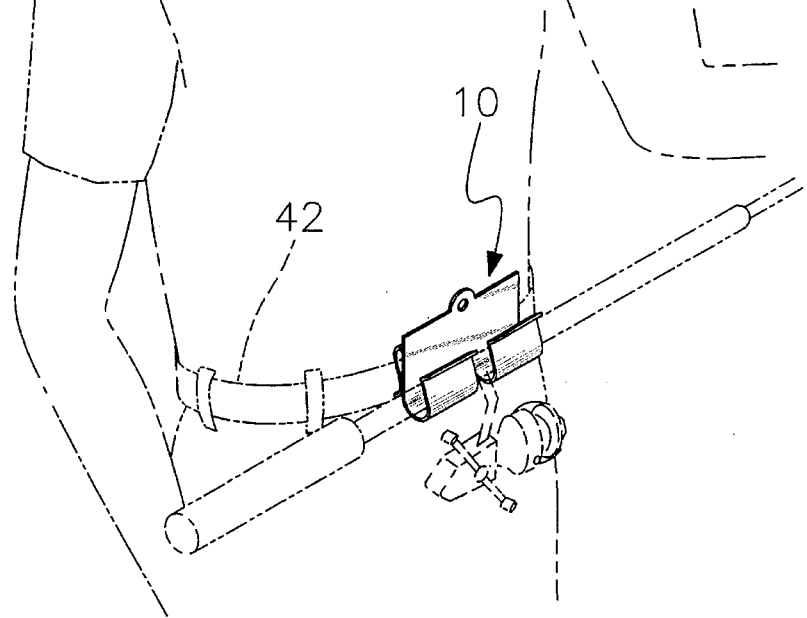
FIG. 6 is an isometric illustration of the present invention in use.

As best illustrated in FIGS. 1 and 2 of the drawings, it can be shown that the mounting means 18 according to the present invention 10 may comprise a hanger 34 projecting from the back plate 20 and including a hanging aperture 36 directed therethrough. A tether 38 is directed through the hanging aperture 36 of the hanger 34 and formed into a continuous loop positionable about a head and neck of an individual so as to hang the engaging means 12 along a chest or torso portion thereof. Alternatively, and as shown in FIGS. 3 through 6, the mounting means 18 may alternatively comprise a belt clip 40 secured to a rear surface of the back plate 20 which can be selectively engaged to a belt 42 worn by an individual such as is illustrated in FIG. 6 of the drawings. Preferably, the belt clip 40 extends completely across a longitudinal length of the back plate 20 and may be secured to the back plate by rivets, threaded fasteners, welding, or like structural joining means. The belt clip 40 is constructed of a substantially resilient material permitting deformation thereof away from the back plate 20 such that a belt 42 can be inserted between the belt clip 40 and the back plate 20, whereby resilient contraction of the belt clip towards the back plate 20 results in a frictional engagement of the device 10 with the belt 42 retaining the device relative thereto. Alternatively, the belt clip 40 can be utilized to capture a portion of a pocket, such as the shirt pocket illustrated in FIG. 1 of the drawings, to retain the device 10 relative to a respective article of clothing.

In use, the body supported fishing rod holder according to the present invention can be easily utilized to support a fishing rod 14 in a desired location relative to an individual. The present invention 10 permits an individual to easily reconfigure the fishing rod 14 utilized in both hands as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A body supported fishing rod holder comprising:

an engaging means for engaging a fishing rod along opposed longitudinal sides of a projection extending from the fishing rod, the engaging means comprises a back plate having a lower edge and lateral edges, a first clamp plate coupled to the lower edge of the back plate proximal to a first one of the lateral edges thereof, the first clamp plate extending towards the back plate, a second clamp plate coupled to the lower edge of the back plate proximal to a second one of the lateral edges thereof, the second clamp plate extending towards the back plate, the clamp plates being constructed of a substantially resilient material permitting selective deformation thereof away from the back plate during insertion of a fishing rod between the clamp plates and the back plate whereby a resilient contraction of the clamp plates towards the back plate permits frictional engagement of the clamp plates relative to the fishing rod, the first clamp plate being spaced from the second clamp plate so as to define a spacing void through which a projection of a fishing rod can extend, each of the clamp plates includes a guide flange projecting therefrom and oriented at an oblique angle relative thereto;

a mounting means coupled to the engaging means for securing the engaging means relative to an individual, the mounting means comprises a hanger projecting from the back plate and including a hanger aperture directed therethrough, a tether directed through the hanging aperture of the hanger and formed in a continuous loop positionable about a head and neck of an individual so as to hang the engaging means along a torso portion thereof, the mounting means further comprises a belt clip secured to a rear surface of the back plate, the belt clip being constructed of a substantially resilient material permitting deformation thereof away from the back plate such that a belt worn by a user can be inserted between the belt clip and the back plate whereby resilient contraction of the belt clip towards the back plate results in a frictional engagement of the holder with the belt retaining the holder relative thereto.

\* \* \* \* \*